United States Patent [11] 3,608,489

[72] Inventor John Henry Croker
 Broxbourne, England
[21] Appl. No. 643,066
[22] Filed June 2, 1967
[45] Patented Sept. 28, 1971
[73] Assignee Gestetner Limited
 London, England
[32] Priority June 14, 1966
[33] Great Britain
[31] 26445/1966

[54] PLANOGRAPHIC PRINTING PLATE
 9 Claims, No Drawings

[52] U.S. Cl. .................................................... 101/462
[51] Int. Cl. ................................................ B41n 1/00,
 B41n 3/00

[50] Field of Search ........................................... 101/462,
 460; 96/33

[56] References Cited
 UNITED STATES PATENTS
2,930,317 3/1960 Perkins ....................... 101/462
3,055,295 9/1962 Perkins ....................... 101/466 X
3,455,241 7/1969 Perkins ....................... 101/426 X Primary Examiner—David Klein
Attorney—Cushman, Darby & Cushman ABSTRACT: Planographic printing plates capable of withstanding long printing runs are made by coating a support with a reaction product of a water-soluble urea- or melamine-formaldehyde resin and a water-soluble colloid containing free acid groups.

PLANOGRAPHIC PRINTING PLATE

This invention relates to planographic printing plates.

According to the present invention, a planographic printing plate comprises a support sheet carrying a layer formed by the reaction of a water-soluble area- or melamine-formaldehyde resin with a water-soluble colloid containing free acid groups. These plates are made by mixing the urea- or melamine-formaldehyde resin with the aforesaid colloid in aqueous solution, coating the solution on the support sheet, and then evaporating the water.

The preferred resins are water-soluble melamine-formaldehyde resins, for example, hexamethoxymethylmelamine and trimethoxymethylmelamine. The water-soluble colloid should give a solution having a pH appreciably below 7, e.g., 3–5. A suitable polymer is polyacrylic acid, though copolymers of acrylamide and acrylic acid, vinyl ether/maleic anhydride copolymers, and cationic starches (i.e., starches in which the primary hydroxyl groups have been converted into carboxyl groups, e.g., the product sold under the Trade Mark "Catokole") and other polymers containing free acid groups, can also be used. The support sheet may be of any kind conventionally used including planographic printing plates, e.g., wet-strengthened paper.

The resins and the colloid are mixed in aqueous solution, and the mixture is then coated by a conventional procedure on the support sheet. Clearly, the resin and the colloid must be chosen, and the conditions of mixing controlled, so that the resin and colloid do not react so rapidly in solution that the mixture cannot satisfactorily be coated. The weight ratio of the colloid concentration to resin concentration in the solution will generally be 1:1 to 5:1, generally about 3–4:1; and the concentration of colloid + resin in the solution is ordinarily 3–15 percent by weight. It is ordinarily preferred to include in the mixture to be coated a filler unreactive with the acid groups in the said colloid, e.g., china clay, titanium dioxide, blanc fixe or silica, in a weight ratio of filler to resin + colloid of 10:1 to 1:1, preferably about 4:1 Fillers which react with the acid groups of the colloid, 6r example alumina hydrate, calcium carbonate, and zinc oxide, must be avoided. The coating weight is conveniently 5 to 30 grams of solids per square meter of support.

After the mixture has been coated on the plate, the coating is dried preferably, in order to expedite the reaction between the resin and the colloid, at a temperature above 80° F. (27° C.), preferably above 200° F. (93° C.). It will be understood that during the drying, the colloid and the resin react together to produce a water-insoluble hydrophilic surface. It has been found that this surface is very durable under lithographic printing conditions, and is capable of withstanding long printing runs.

The following example illustrates the invention.

EXAMPLE

A mixture is prepared of china clay (75 g.), medium viscosity polyacrylic acid (18.5 g. dry weight, sold as DSP 21 by Allied Colloids), hexamethoxymethylmelamine (5 g.), water (250 ml.), and methylated spirit (10 ml.) the mixture so obtained (in which the china clay is the only insoluble ingredient) is then coated on a wet-strengthened paper of a kind ordinarily used as a support sheet for planographic printing plates, at a coating weight of 15 grams per sq. meter. The coating is dried at about 250° F. (121° C.), and can then be used as a direct image offset plate after imaging in the usual manner. The plate surface can withstand long runs under lithographic printing conditions.

I claim:

1. A planographic printing plate comprising a support sheet carrying layer formed by the reaction at a pH below 5, between, as the sole reacting materials, a water-soluble urea- or melamine-formaldehyde resin and a water-soluble colloid containing free acid groups, said pH being provided by said acid groups only.

2. Planographic printing plate according to claim 1 in which the said resin is hexamethyoxmethylmelamine or trimethoxymethylmelamine.

3. A planographic printing plate according to claim 2 in which the said water-soluble colloid is polyacrylic acid.

4. A planographic printing plate according to claim 1 in which the said water-soluble colloid is polyacrylic acid, an acrylamide/acrylic acid copolymer, a vinyl ether/maleic anhydride copolymer, or a starch containing carboxylic acid group.

5. A planographic printing plate according to claim 1 in which the weight ratio of the said colloid to the said resin is 1:1 to 5:1.

6. A planographic printing plate according to claim 1 in which the said layer also contains a filler unreactive with the acid groups in the said colloid.

7. A planographic printing plate according to claim 6 in which the filler is china clay, titanium dioxide, blanc fixe or silica.

8. A planographic printing plate according to claim 6 in which the weight ratio of filler to resin and colloid is 10:1 to 1:1.

9. A planographic printing plate according to claim 1 in which the said layer weighs 5 to 30 grams per square meter.